US012704822B2

(12) United States Patent
Gonzalez Aguirre et al.

(10) Patent No.: US 12,704,822 B2
(45) Date of Patent: Aug. 11, 2026

(54) EDGE-BASED END DEVICE CONTROL USING ASYNCHRONOUS ADAPTIVE MOTION PRIMITIVES

(71) Applicant: Intel Corporation, Santa Clara, CA (US)

(72) Inventors: David Gonzalez Aguirre, Portland, OR (US); Rafael De La Guardia Gonzalez, Teuchitlan (MX); Javier Felip Leon, Hillsboro, OR (US); Javier Perez-Ramirez, North Plains, OR (US); Julio Zamora Esquivel, West Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 505 days.

(21) Appl. No.: 18/343,376

(22) Filed: Jun. 28, 2023

(65) Prior Publication Data

US 2025/0004820 A1 Jan. 2, 2025

(51) Int. Cl.

| | |
|---|---|
| ***G05B 19/042*** | (2006.01) |
| ***H04L 67/10*** | (2022.01) |
| ***H04L 67/125*** | (2022.01) |
| ***H04L 67/565*** | (2022.01) |

(52) U.S. Cl.
CPC ............ *G05B 19/042* (2013.01); *H04L 67/10* (2013.01); *H04L 67/125* (2013.01); *H04L 67/565* (2022.05)

(58) Field of Classification Search
CPC ..... G05B 19/042; H04L 67/10; H04L 67/125; H04L 67/565
See application file for complete search history.

(56) References Cited

U.S. PATENT DOCUMENTS

| | | | | |
|---|---|---|---|---|
| 10,173,319 B1 | 1/2019 | Jules et al. | | |
| 2018/0164779 A1* | 6/2018 | Kim | ................... | G05B 19/4063 |
| 2019/0271979 A1* | 9/2019 | Michael | ............... | G05D 1/0038 |

(Continued)

FOREIGN PATENT DOCUMENTS

| | | |
|---|---|---|
| EP | 3930279 A1 | 12/2021 |

OTHER PUBLICATIONS

Apr. 17, 2024 (PCT) International Search Report and Written Opinion—App. PCT/US2023/084707.

(Continued)

*Primary Examiner* — Jay Khandpur
(74) *Attorney, Agent, or Firm* — Banner & Witcoff, Ltd.

(57) ABSTRACT

A component of an edge server, including: processor circuitry; and a non-transitory computer-readable storage medium including instructions that, when executed by the processor circuitry, cause the processor circuitry to: distribute, to a client device, tokens that enable its end device to execute respective asynchronous adaptive motion primitives ($A^2$MPs) of a task graph of a task, wherein an $A^2$MP is a motion primitive of encoded motion factoring in motion updates from the end device; receive $A^2$MP task execution status messages during execution of the $A^2$MPs; and dynamically update the distribution of the token or the task graph based on the $A^2$MP task execution status messages to modify a trajectory of the end device.

20 Claims, 8 Drawing Sheets

(56) References Cited

U.S. PATENT DOCUMENTS

2021/0331316 A1 10/2021 Bhat et al.
2023/0262045 A1* 8/2023 Ahokas ............... H04L 63/0807
726/6

OTHER PUBLICATIONS

M. Saveriano, et al., "Dynamic Movement Primitives in Robotics: A Tutorial Survey," www.sagepub.com, 43 pgs., Feb. 7, 2021.
S. Schaal, "Dynamic Movement Primitives—A Framework for Motor Control in Humans and Humanoid Robotics", Computer Science and Neuroscience, 10 pgs.
Studywolf, "Dynamic Movement Primitives Part 1: The Basics," https://studywolf.wordpress.com/2013/11/16/dynamic-movement-primitives-part-1-the-basics/, 26 pgs., Nov. 2016.
K. Kaheman, et al., " SINDy-PI: A Robust Algorithm for Parallel Implicit Sparse Identification of Nonlinear Dynamics," royalsocietypublishing.org, 25 pgs., Apr. 21, 2023.
M. Eisen, et al., "Control Aware Radio Resource Allocation in Low Latency Wireless Control Systems," IEEE Internet of Things Journal, 13 pgs., Oct. 2019.

* cited by examiner

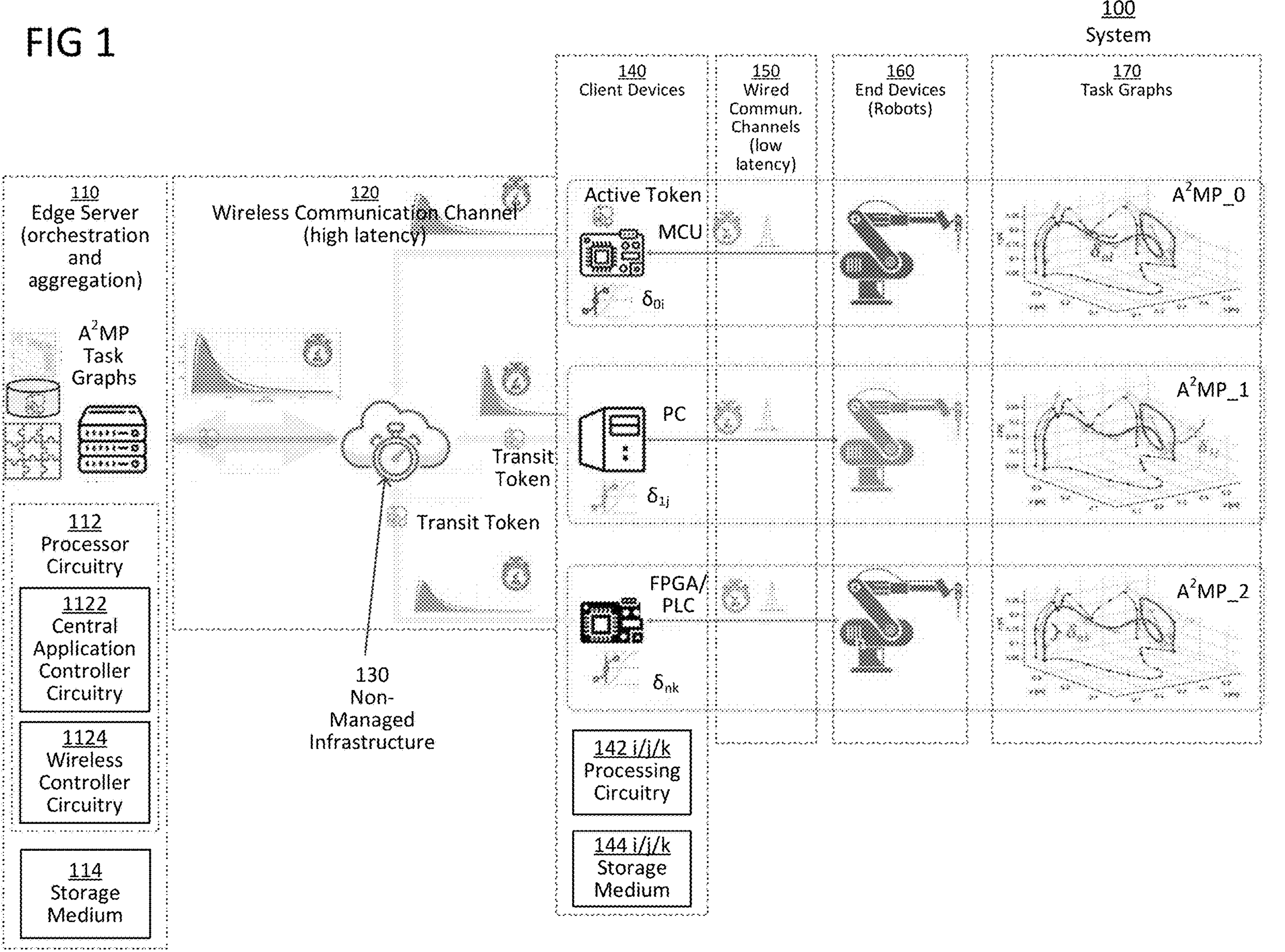
FIG 1
100
System
140
Client Devices
150
Wired
Commun.
Channels
(low
latency)
160
End Devices
(Robots)
170
Task Graphs
110
Edge Server
(orchestration
and
aggregation)
120
Wireless Communication Channel
(high latency)
Active Token
MCU
$\delta_{0i}$
$A^2MP\_0$
$A^2MP$
Task
Graphs
PC
$\delta_{1j}$
$A^2MP_1$
Transit
Token
Transit Token
112
Processor
Circuitry
1122
Central
Application
Controller
Circuitry
FPGA/
PLC
$\delta_{nk}$
$A^2MP_2$
130
Non-
Managed
Infrastructure
1124
Wireless
Controller
Circuitry
142 i/j/k
Processing
Circuitry
114
Storage
Medium
144 i/j/k
Storage
Medium 160
End Devices
(abstracted from factory setting)
(see lower portion
of FIG 11)
200
End Devices
A²MP
A²MP
A²MP
A²MP
A²MP
A²MP
Status Updates
(see FIG. 7)
160
End Devices
(in factory
setting)
A²MP
A²MP
A²MP
A²MP
A²MP 300A
Graph of Basis Functions in Canonical Variable Domain
Kernal (psi) Activations
Activation
x 300B
Graph of Dynamic Movement Primitives (DMPs)
DMP Imitation Path
DMP 1
DMP 2
desired paths
Trajectory
time (ms)

400
Graph of Exponential Decay in Canonical Variable Domain

500
Pick-and-Place Task Process
160
End Device
162
Object
$A^2MP_1$
170
Task Graph
510
520
530
/Idle
540
550
560
570
110
Edge Server
160
End Device
51
Task graph descriptor
52
Task graph descriptor ACK
53
Task token $DMP_1$
54
Task execution status update $\delta_1$
55
Task execution status update $\delta_2$
...
56
Task execution status update $\delta_n$
57
Task execution ACK – Token used
See FIG 4

700
Timeline of Status Packet Transmission Time from End Device based on DMP Parameter, Cartesian, and Joint Space Rules
time
$DMP_1$ parameter space (u)
$\Delta u > 0.01$
$\Delta u > 0.1$
u
time
$DMP_1$ cartesian space (x)
$\Delta x > 0.05$
$\Delta x > 0.01$
x
time
$DMP_1$ joint space (q)
$\Delta q > 1$
$\Delta q > 10$
$\phi$
$\Delta q > 1$
$\Delta u > 0.1$
$\Delta x > 0.01$
Start
Total $DMP$ execution time
end

EDGE-BASED END DEVICE CONTROL USING ASYNCHRONOUS ADAPTIVE MOTION PRIMITIVES

TECHNICAL FIELD

Aspects described herein generally relate to edge-based end device control, particularly edge-based end device control using asynchronous adaptive motion primitives.

BACKGROUND

In large-scale deployments of robots, an orchestration approach should effectively handle the simultaneous aggregation and coordination of robot workloads. This approach should consider the expected limitations of communication channels when distributing low-level robot control. Collaborative robots, commonly known as cobots, typically operate at rates below 250 Hz, while industrial robots face even greater challenges with a maximum feasible rate of 1 kHz.

The tiered partitioning and aggregation strategy described herein enables lower- and higher-level control, incorporating asynchronous and non-deterministic coordination mechanisms. Moreover, the control of robot motion and trajectory steering is regulated dynamically to ensure the reliable management of communication channel variability, including factors such as time-varying throughput capacity and latency.

BRIEF DESCRIPTION OF THE FIGURES

FIG. 1 illustrates a schematic diagram of a system in accordance with aspects of the disclosure.

DETAILED DESCRIPTION

This disclosure addresses the challenges associated with controlling high-frequency, low-level motions of robots and coordinating them at a higher level, considering potential limitations in communication channel reliability. The disclosed aspects include elements such as Asynchronous Adaptive Motion Primitives ($A^2$MPs) organized into task graphs for hierarchical partitioning based on latency requirements, and a hybrid formulation combining stochastic and discrete events to achieve control, flexibility, scalability, and seamless integration with a lightweight computational footprint.

I. Overview

Figure 2:
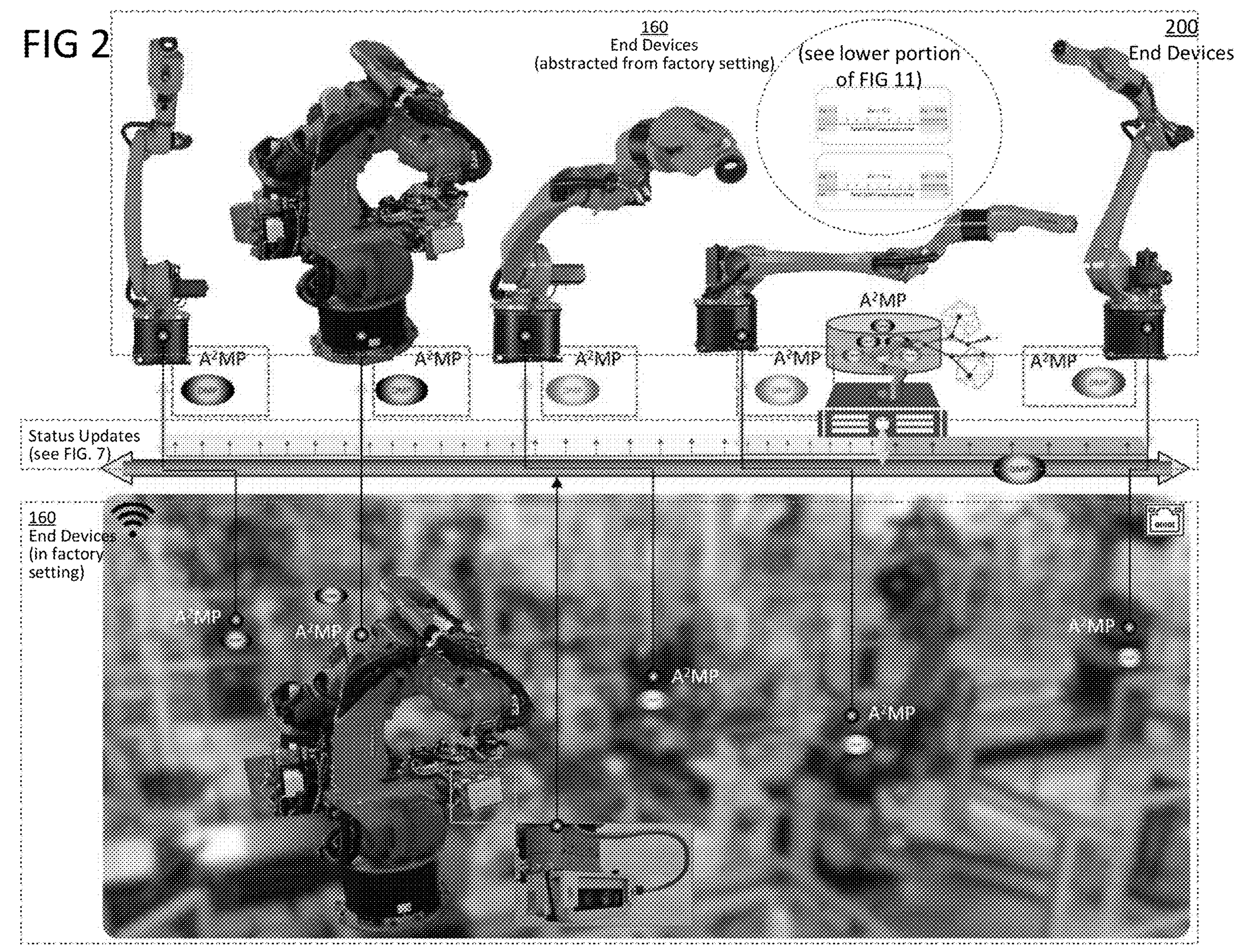
FIG. 2 illustrates end devices of the system of FIG. 1 in a factory environment in accordance with aspects of the disclosure.

FIG. 1 illustrates a schematic diagram of system 100 in accordance with aspects of the disclosure. FIG. 2 illustrates a plurality of end devices 200 belonging to the system of FIG. 1 in a factory environment in accordance with aspects of the disclosure.

The system 100 comprises an edge server 110, a wireless channel 120 with a non-managed structure 130, client devices 140, wired communication channels 150, end devices 160, and task graphs 170. System 100 involves edge-based simultaneous control of end devices at a low level, coupled with high-level task orchestration through asynchronous adaptive motion primitives ($A^2$MPs) to achieve workload aggregation in network-aware scalable deployments. This approach is applicable to networks with wired and/or wireless communication channels. The non-deterministic adaptation for communication channels compensates for dynamic variations with ad-hoc devices.

The edge server 110 coordinates and generates motion plans in the form of $A^2$MPs using the three-dimensional sensors on the end devices 160.

The edge server 110 is equipped with processor circuitry 112 and a storage medium 114. The processor circuitry includes central application controller circuitry 1122 and wireless controller circuitry 1124. The wireless controller circuitry 1124 facilitates the transmission and reception of tokens and monitors the state of the wireless communication channel 120.

The client devices 140 encompass various examples such as machine control units (MCUs), personal computers (PCs), field-programmable gate arrays (FPGAs), programmable logic controllers (PLCs), and similar devices. The client devices 140 include inputs 142 for receiving data and outputs 144 for sending operating instructions. Fundamentally, a client device's job is to control the functions of the end devices 160.

The end devices 160 may be autonomous robots or cobots or any other autonomous agent, such as an autonomous vehicle. An "autonomous agent" may describe an agent that implements all or substantially all actions. Sometimes an "autonomous agent" is distinguished from a "partially autonomous agent" or a "semi-autonomous agent" to indicate that the agent is capable of implementing some (but not all) actions, possibly at certain times, under certain conditions, or in certain areas.

The task graphs 170 represent motion plans intended for execution by the end devices 160. The processor circuitry defines and distributes task graphs 170 to the client devices 140 when a task is assigned or when task graph 170 is modified.

The wireless communication channel 120 establishes a communicative link between the edge server 110 and the client device 140, typically through wireless means, though the disclosure is not limited in this respect. The wired communication channel 150 connects the client devices 140 and the end devices 160, typically through wired means, though again, this is not meant to be limiting. The wired communication channel 150 generally offers lower latency compared to the wireless communication channel 120.

The processor circuitry 112 is responsible for distributing tokens to a client device 140, allowing its respective end device 160 to execute asynchronous adaptive motion primitives ($A^2$MPs) that are part of a task graph 170 for a given task. Additionally, the processor circuitry 112 can receive $A^2MP$ task execution status messages during the execution of the $A^2MPs$, and subsequently adjust the distribution of tokens or modify the task graph 170 based on these $A^2MP$ task execution status messages. This enables the dynamic modification of the trajectory of the end device 160.

Furthermore, the processor circuitry 112 is capable of distributing tokens to multiple client devices 140, allowing their respective end devices 160 to execute $A^2MPs$ from their respective task graphs 170, which define individual tasks. The processor circuitry 112 also temporally coordinates the execution of $A^2MPs$ among the multiple end devices 160. An example of implementing temporal coordination is the insertion of waypoints in each end device's trajectory, ensuring they are reached simultaneously.

II. Asynchronous Adaptive Motion Primitives ($A^2MP$)

An $A^2MP$ is a dynamic movement primitive (DMP) with network attributes. $A^2MPs$ represent an advancement of dynamic movement primitives (DMPs) and offer improved communication and coordination capabilities through asynchronous update packages driven by latent space deltas.

The edge server 110 generates and transmits $A^2MPs$ to achieve network-aware low-level control for end clients (robots) 160. These $A^2MPs$ enable the end devices 160 to execute tasks that are prone to uncertainties and require real-time control at rates greater than 1 kHz. Specifically, these primitives are well-suited for addressing the real-world variations encountered in sensor-based end device tasks, including visual-servoing, where six-dimensional poses and associated velocities are updated at each control cycle.

The $A^2MP$ control is divided based on latency, with low-level control being split into two components. The first component involves local control at the client device 140, while the second component entails high-level coordination performed by the edge server 110, which includes trajectory planning. To effectively manage deployment, the edge server 110 utilizes a real-time probability density function (PDF)-based wireless communication channel occupancy state to implement corrective measures, such as throttling and pause-and-resume strategies.

Figures 3A, 3B:
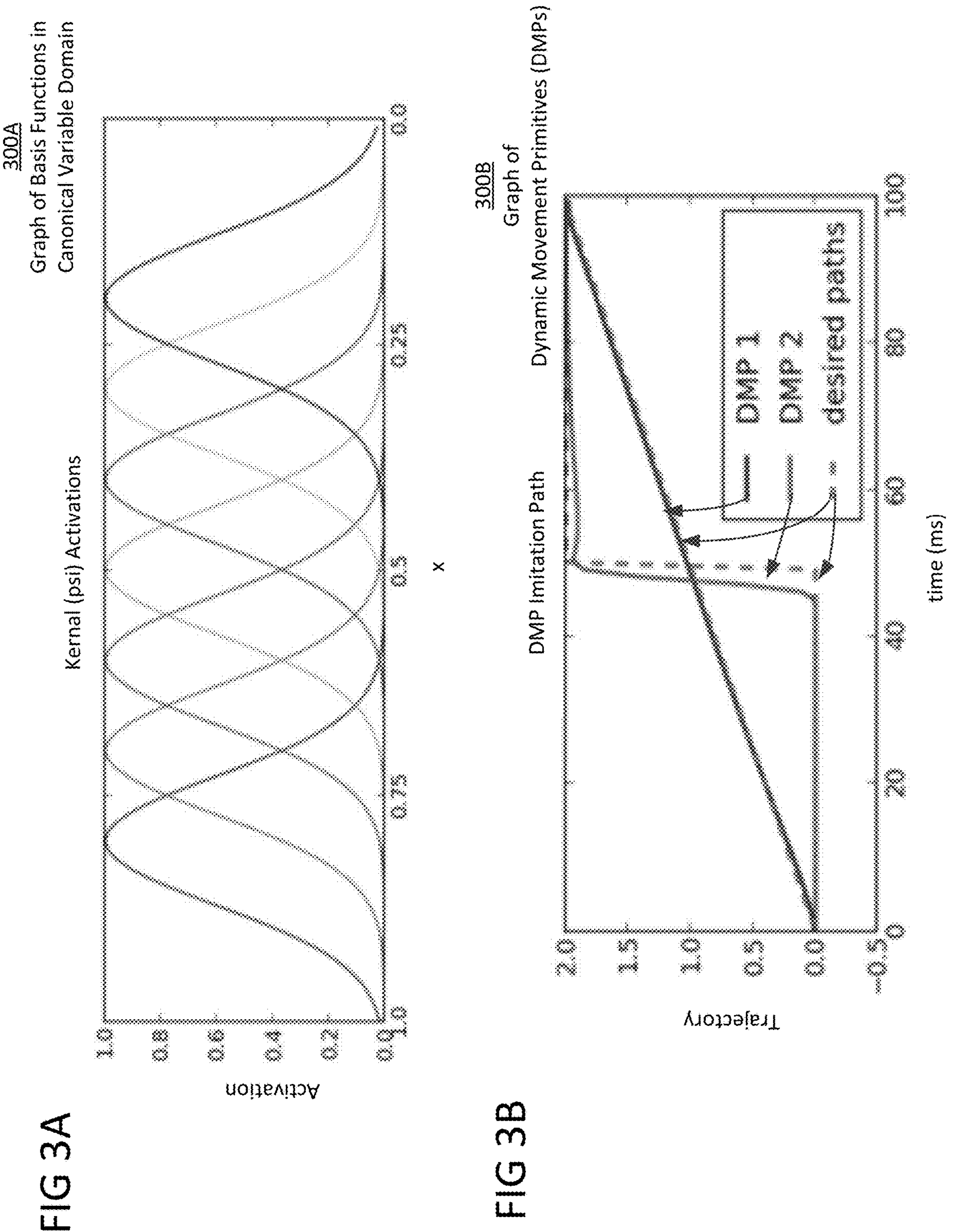
FIG. 3A illustrates a graph of basis functions in a canonical variable domain in accordance with aspects of the disclosure.
FIG. 3B illustrates a graph of dynamic movement primitives (DMPs) examples reproducing two trajectories in accordance with aspects of the disclosure.

FIG. 3A depicts graph 300A illustrating basis functions (kernels) in a canonical variable domain, in accordance with aspects of the disclosure. The distribution of tokens of task graph 170 undergoes dynamic updates, which are influenced by the sliding nature of the trajectory within the canonical variable domain. These updates occur along basis functions that activate at different regions of the trajectory. The variable x represents the canonical variable, ranging from 1 to 0, providing information on the remaining distance the end device 160 needs to cover in order to complete its trajectory.

In FIG. 3B, graph 300B demonstrates examples of DMPs reproducing two trajectories. The number N of basis functions, as depicted in FIG. 3A, affects the extent to which the DMP accurately follows a given trajectory. Specifically, the tightness of the DMP's alignment with the trajectory is influenced by the number of basis functions employed.

A discrete motion primitive is essentially a dynamic point attractor in one dimension. However, it can be simultaneously applied to allDegrees of Freedom (DoF) of an end device 160, thereby generalizing the concept to N dimensions (N-D). The application of motion primitives can vary depending on the use case, either in joint space or task space.

First, let's consider the system state $y \in R$ and a goal state $g \in R$. We can formulate a dynamic attractor using a proportional-differential control signal equation as follows:

$$\ddot{y} = \alpha_y(\beta_y(g - y) - \dot{y}). \qquad \text{(Equation 4)}$$

Here, $\alpha_y \in R^+$ and $\beta_y \in R^+$ are acceleration and velocity-convergence gains, respectively. When applying this control force, the end device 160 will reach the target state when g=y and $\ddot{y}=0$. To provide adaptation capabilities, we can modify the trajectory by adding a non-linear forcing term $f$:

$$\ddot{y} = \alpha_y(\beta_y(g - y) - \dot{y}) + f. \qquad \text{(Equation 5)}$$

To incorporate diminishing and spatial scaling properties into $f$, we model it as a canonical dynamic system using an auxiliary sliding-variable called x:

$$\dot{x} = -\alpha_x x. \qquad \text{(Equation 6)}$$

Therefore, $f(x, g)$ is a forcing function that adjusts the end device 160 based on the goal state and the sliding variable. We can formulate it using a weighted kernel assembly:

$$f(x, g) := \frac{\sum_{i=1}^{N} \psi_i W_i}{\sum_{i=1}^{N} \psi_i} x(g - y_0), \qquad \text{(Equation 7)}$$

where $$\psi_i := e^{-h_i(x-c_i)^2} \qquad \text{(Equation 8)}$$

represents a basis-function (kernel) $\psi$, usually a Gaussian (as shown in FIG. 3A), which is individually weighted by $W_i$ and centered at $c_i$ with variance $h_i$. Notice that the convergence term $x(g-y_0)$ guides the convergence of y by incorporating the goal state g and the initial state $y_0$. The canonical sliding variable x, which diminishes over time from $x_0=1$ to 0, ensures convergence to the g state attractor. The spatial scaling term $(g-y_0)$ implies that the forcing function $f$ continuously adjusts based on the goal state g, which is important in sensor-driven operations, particularly in vision-based scenarios where the end device's six-dimensional pose changes in each execution trial. This adaptation ensures convergence even if the covered distance is longer or shorter than originally planned. On the other hand, the canonical variable x covers a unitary arc length regardless of the Cartesian distance. If the goal g is constantly moving, a time-out can be implemented to present the end device 160 from pursuing an unreachable position.

Figure 4:
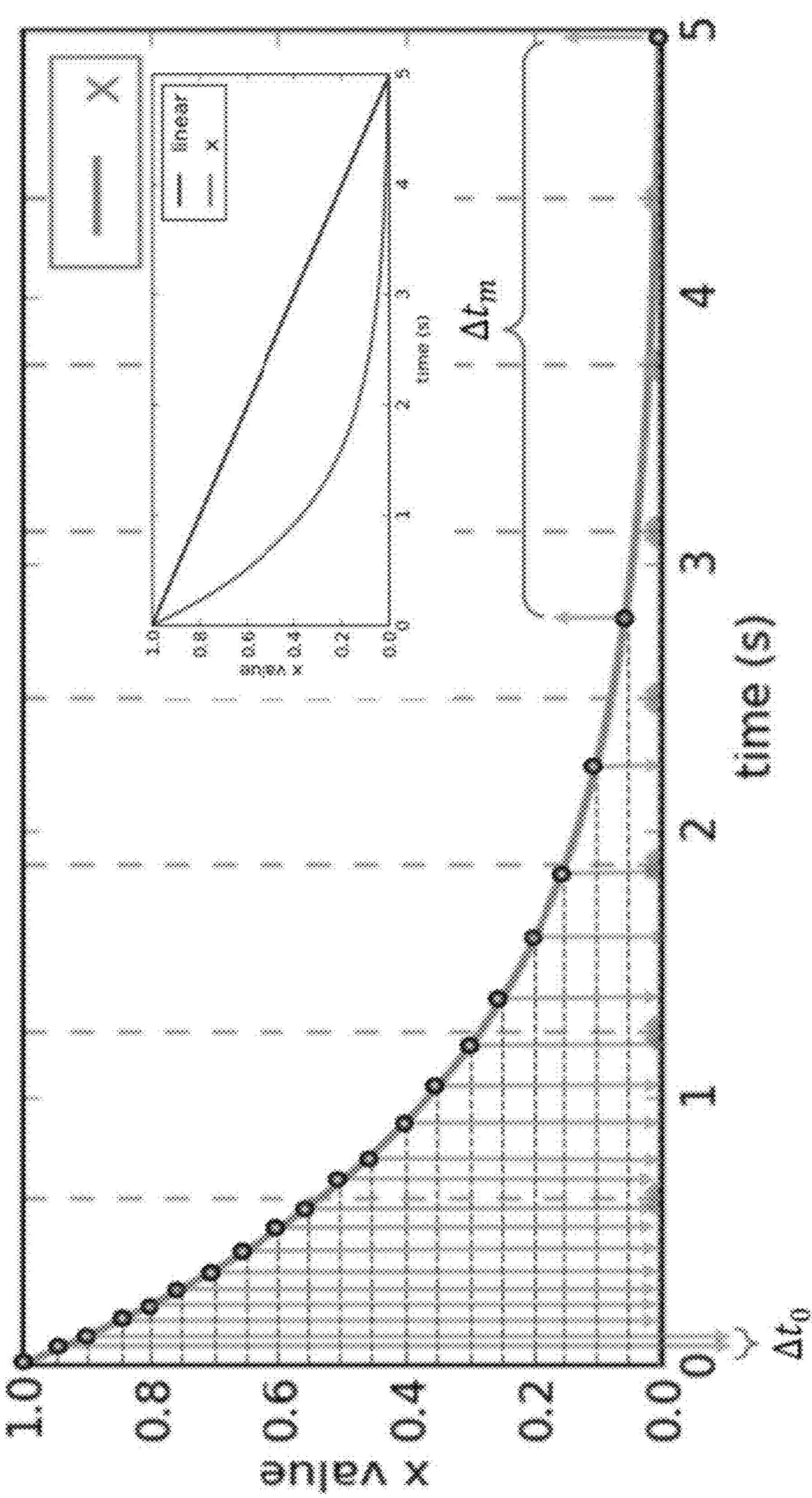
FIG. 4 illustrates a graph of exponential decay in a canonical variable domain in accordance with aspects of the disclosure.

FIG. 4 illustrates graph 400 depicting exponential decay in the system, with the canonical variable x and its temporal relation highlighting the significance of a minimal $\Delta t_{min}$ and maximal $\Delta x$ to ensure updates remain invariant with a maximal update frequency and a minimal one.

The edge server 110 is operable to receive $A^2MP$ task execution status messages at a rate based on the condition of the wireless communication channel 120 between the edge server 110 and the client device 140. The condition of the wireless communication channel 120 may be based on factors such as communication channel throughput, capacity, or latency. As depicted in FIG. 4, the edge server 110 is operable to receive $A^2MP$ task execution status messages at a rate corresponding to a location along the trajectory in a canonical variable domain.

One derived effect of the system $\dot{x}=-\alpha_x x$ is its non-linear convergence, as shown in the upper right plot of FIG. 4. The execution of a motion and its impact on coordination is that the regular intervals x lead to temporal deltas of different magnitude, as indicated by $\Delta t_0$ and $\Delta t_m$ in the lower plot of FIG. 4. This implies that the edge server 110 receives updates at significantly different time intervals. This behavior is expected because the velocity and acceleration tend to zero as x approaches its minimum value, indicating that the robot has reached the attractor point. Therefore, only the final completion update is necessary. However, at the beginning of the trajectory, there are numerous updates ($\Delta t_0$, $\Delta t_1$). To manage this, a minimum $\Delta t_{min}$ is imposed, typically ranging from 50 to 250 ms, depending on the network and process capacity. Finally, the $A^2MP$ delta is scheduled if either of the two criteria in the function $\Phi$ is met, namely:

$$\delta_i = \Phi(\min(\Delta x_i, \epsilon) \vee \max(\Delta t_i, \Delta t_{min})). \quad \text{(Equation 1)}$$

Here, $\epsilon$ denotes the granularity for a specific $A^2MP$. The first criterion ensures a minimum delta in relation to the granularity $\epsilon$, while the second criterion accounts for the maximum time difference required for execution.

In summary, the asynchronism in the execution progress of an $A^2MP$, characterized by the variable $\Delta t$, adapts to the trajectory length and the temporal scaling of the $A^2MP$ plan. This formalizes the $A^2MP$ model for one dimension. The composability is straightforward as the motion dimensions (joints or Cartesian coordinates) are mutually orthogonal within a given motion plan.

III. $A^2MP$ Task Graphs-Formalism and Operation Model

A. Communications Flow and Asynchronous Packages

The above discussion on $A^2MP$ deltas 8 outlines the criteria for when to notify the edge server 110 regarding the progress of task execution. This approach enables the representation of the start, evolution, and completion of an end device trajectory, while minimizing network traffic and accommodating unpredictable latency issues. The deltas comprise of the following components: a timestamp (synchronized with the edge server 110), identification of the end device 160, identification of the $A^2MP$, a canonical value representing the current execution status, and a progressive sequence counter that includes a cyclic redundancy check (CRC) to prevent packetization errors in end device 160 communications.

B. Token-Driven Execution Control Via Single-State Graph Traversal

Figure 5:
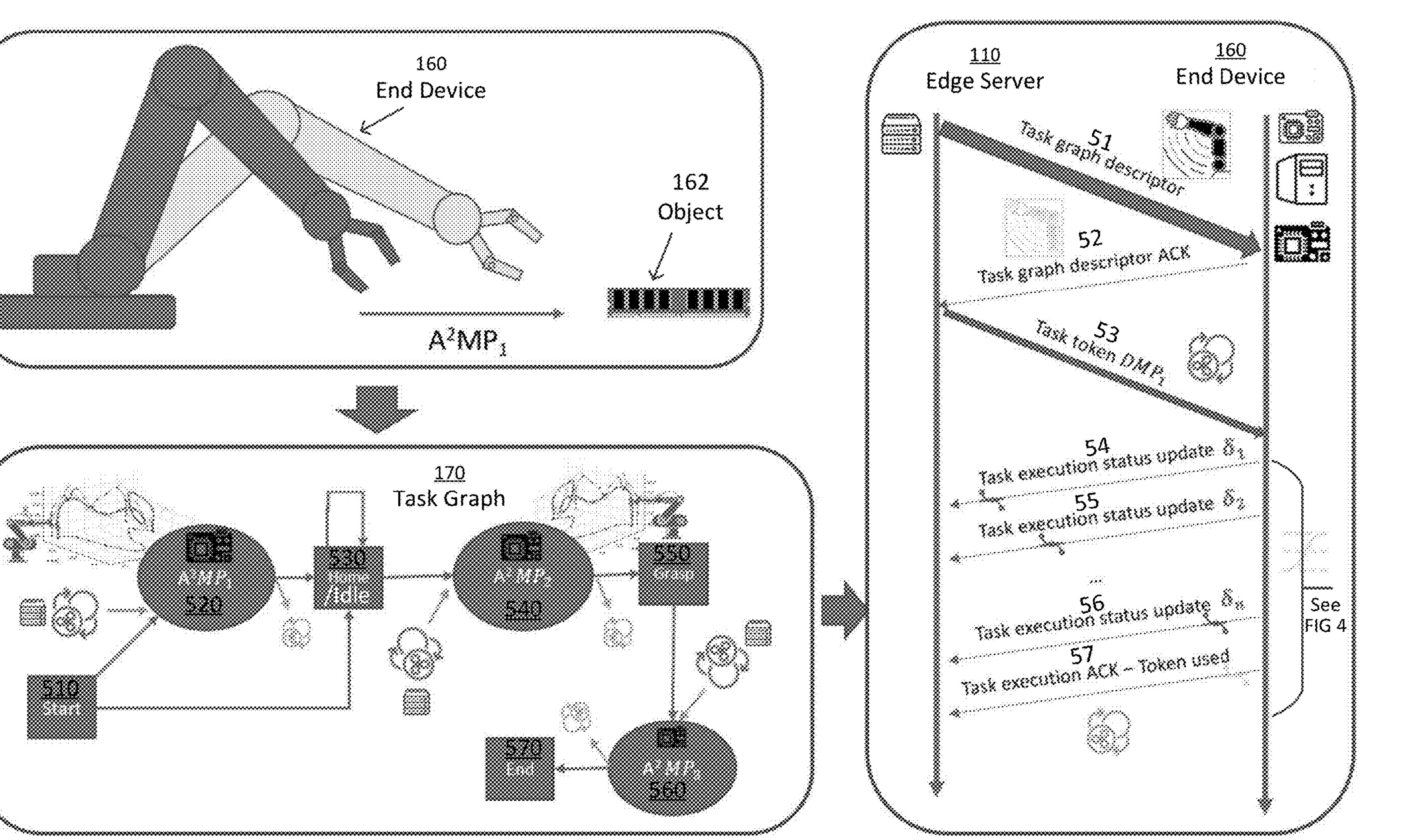
FIG. 5 illustrates an example of an $A^2$MP task execution status traffic profile in a pick-and-place task process in accordance with aspects of the disclosure.

FIG. 5 illustrates a schematic diagram of a pick-and-place task process 500 in accordance with aspects of the disclosure.

The pick-and-place task involves a task graph 170 where the end device 160 performs the action of picking up and placing an object 162. The task graph 170 is transmitted wirelessly via the wireless communication channel 120 to the client device 140. Once the central application controller circuitry 1122 determines that the end device 160 is ready to proceed to the next step in the task graph 170 and execute the next $A^2MP$ (referred to as "$A^2MP_1$" in this figure), it sends a token to the end device 160, granting permission to execute $A^2MP_1$. During the execution of the $A^2MP$, the end device 160 provides status updates to the central application controller circuitry 1122, and upon completing the task, it sends a final acknowledgment packet (ACK).

The pick-and-place task, as exemplified here, has three states. Initially, at the beginning of the operation (510), the end device 160 determines the pose of the object 162 using its three-dimensional vision capabilities and transmits it as the target pose. Subsequently, the motion plan for grasping the object 162 is determined by the edge server 110 and encoded into an $A^2MP$ (DMP with network attributes) (520). At this point, the end device's low-latency controller is prepared to execute the task, but the execution does not commence until an enable token is received from the edge server 110. The coordinated acknowledgment mechanism described in the "Wireless-aware $A^2MP$ Execution" section enables a transition to the execution of $A^2MP_1$, which is indicated in the task graph 170 by marking the corresponding node (520). Once the end device 160 reaches the pre-grasp position, the task graph 170 remains in a stop/idle state (530) until the next enable token arrives, at which point the end device 160 awaits the enable token (540), signifying the execution of $A^2MP_2$ for grasping the object (550). Similarly, the end device 160 waits for the arrival of the next enable token to execute $A^2MP_3$ (560), leading to the completion of the process (570). This coordination of critical task transitions allows for the establishment of mutex, semaphores, and other coordination mechanisms for multi-end device tool operations and perceptual deep neural network (DNN) inference within the same edge server 110.

The communication between the edge server 110 and the end device 160 for the execution of an $A^2MP$ is illustrated on the right-hand side of the figure. The edge server 110 sends the motion plan's task graph 170 (51) to the client device 140 for execution by the end device 160. The end device 160 acknowledges the receipt of the task graph 170 (52) to inform the edge server 110 of its readiness for execution. Subsequently, the edge server 110 transmits a task token, $DMP_1$ (53) (an $A^2MP$ without network attributes), to initiate the execution of the first motion primitive. The client device 140 controls the end device 160 during the execution of the motion primitive.

Figure 7:
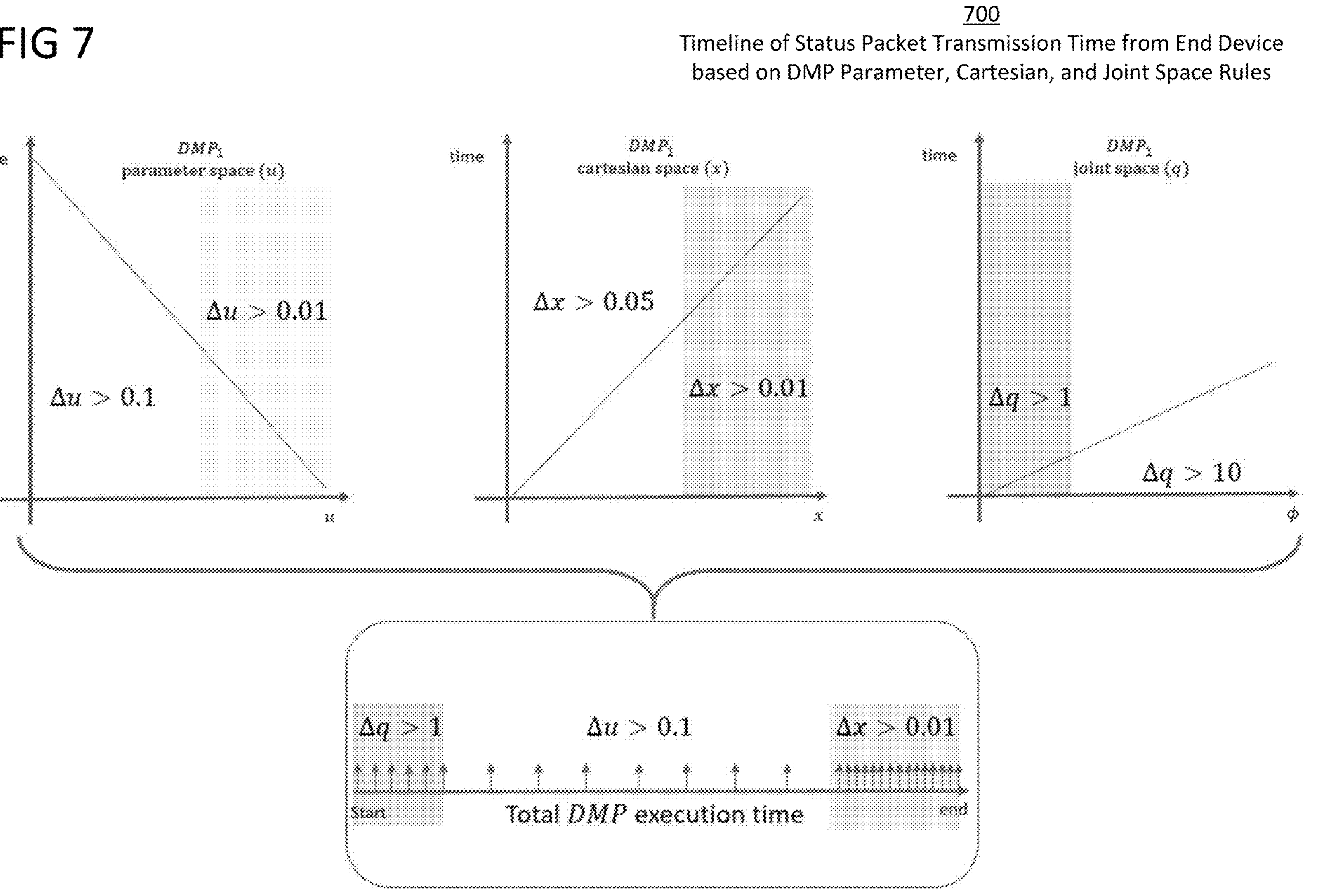
FIG. 7 illustrates a timeline of status packet transmission time from an end device based on DMP parameter, cartesian, and joint space rules in accordance with aspects of the disclosure.

During the execution of the motion primitive, the end device 160 transmits $A^2MP$ task execution status messages to the edge server 110, either in canonical space or in time. The $A^2MP$ task execution status messages are asynchronous. In this example, there are three $A^2MP$ task execution status messages (54, 55, 56), with $A^2MP$ deltas ($\delta 1$, $\delta 2$, $\delta 3$) in parameter, joint, or Cartesian space, as illustrated in FIG. 7. Once the $A^2MP$ is completed, the end device 160 sends a task execution acknowledgment message to the edge server 110, indicating the token has been used (57).

The task tokens enable the edge server 110 to coordinate tasks among multiple end devices 160. Consider a scenario where the first end device 160 places the object 162 in a location where another end device 160 is required to solder the object. Due to the unreliability and latency of the wireless communication channel 120, instead of sending a stop signal to the end device 160, the edge server 110 simply withholds sending the next token for execution along the task graph 170. The end device 160 will stop autonomously since it recognizes the need to remain idle until a new token for the next DMP arrives. By dynamically adjusting the motions of the end device 160 based on the $A^2MP$ deltas (81, 82, 83), such as delaying the transmission of the next token, the edge server 110 effectively coordinates multiple end devices 160 using the tokens. Meanwhile, the client device 140 maintains high-frequency control over the end device 160, while the end device 160 sends the $A^2MP$ task execution status messages (54, 55, 56) to the edge server 110.

IV. End Device Perception and Motion Planning at the Edge Server

Workload aggregation at the edge server 110 is responsible for coordinating the tasks and performing deep neural network (DNN) computations to infer the state, pose, and identification of objects to be grasped. However, as these capabilities are beyond the scope of this disclosure, a detailed description is omitted for brevity.

V. Multiple-Robot Coordination Through Variable Non-Linear Canonical Convergence In the case of multiple end devices 160, temporal coordination plays a significant role. This coordination becomes especially important when two or more end devices 160 share the same workspace or need to visit the same location during different phases of their operation. To ensure effective temporal coordination, waypoints can be incorporated into the trajectory of respective end devices 160. These waypoints serve as targets that the end devices 160 aim to reach simultaneously.

To illustrate this further, let's consider the $i^{th}$ waypoint in the timeline. At this specific point, each end device 160 within the coordination group has an arrival time (denoted as $t_i$) for their respective waypoint. Consequently, the respective end devices 160 have $A^2MPs$ starting at $t_i+\Delta$ for the same waypoint. However, a challenge arises when the end devices follow the same phase profile, as depicted in FIG. 3B. This uniformity leads to a communication traffic issue.

One straightforward but inefficient solution is to introduce a random delay ($\Delta$) for each end device 160. However, a more effective approach involves creating distinct non-linear phase equations that share a common attractor point at x=0, resembling the canonical system. This alternative allows for improved coordination without the need for random delays. One such equation can be represented as follows:

$$\dot{x} = -\alpha_x x. \quad \text{(Equation 2)}$$

By adopting different non-linear phase equations with the same attractor point, the temporal coordination among multiple end devices 160 can be achieved more efficiently.

Figure 6:
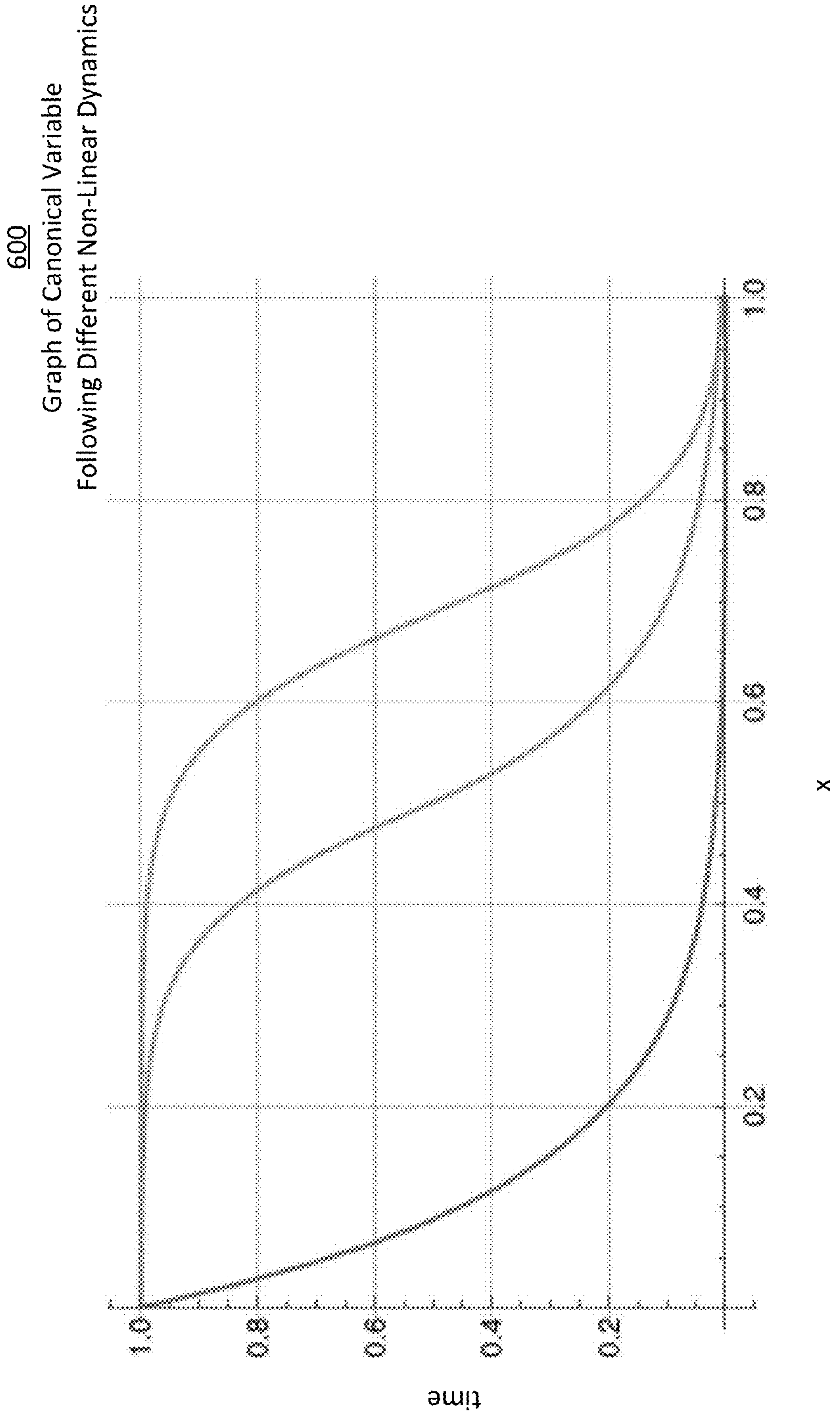
FIG. 6 illustrates an example graph of a canonical variable following different non-linear dynamics in accordance with aspects of the disclosure.

FIG. 6 depicts an exemplary graph 600 illustrating the behavior of a canonical variable exhibiting different non-linear dynamics, in accordance with aspects of the disclosure.

The exemplary graph 600 in the canonical system represents the non-linear dynamics as follows:

$$\dot{x} = -\alpha_x e^{c(\xi-x)}/\left(1+e^{c(\xi-x)}\right)^2, \quad \text{(Equation 3)}$$

A piecewise system is introduced by combining the aforementioned two systems. These dynamic systems are designed offline and dynamically assigned at runtime by the central application controller circuitry 1122, based on the prevailing network conditions. The inclusion of the non-linear term $\xi$ alters the shape of the canonical curves displayed in graph 600.

In a data-driven aspect, the non-linear systems are designed to ensure stability. To achieve this, a sparse identification of nonlinear dynamics (SINDy) algorithm is employed. This algorithm effectively identifies sparse non-linear dynamics by utilizing a customized dictionary of basis functions, thereby enabling the discovery of a nonlinear dynamic system that produces the desired phase behavior. Consequently, this approach results in the generation of complex, monotonically decreasing functions, enabling end devices 160 to accelerate, decelerate, or even come to a complete stop at predetermined time intervals to facilitate coordinated movements.

VI. Wireless-Aware $A^2MPs$ Execution

A. Wireless Communication Protocol

After defining the task graphs 170 associated with each task, the central application controller circuitry 1122, located at the edge server 110, is responsible for distributing this information to the end devices 160 through the wireless communication channel 120. The distribution of this non-time-critical information occurs either once or when there is a change in the task (and the corresponding task graph 170) assigned to an end device 160.

Once the end devices 160 receive their respective task graphs 170, the central application controller circuitry 1122 proceeds to distribute tokens throughout the network. These tokens, referred to as $tA^2MP$ tokens, enable the end devices 160 to advance within their task graphs 170 and move on to the next $A^2MP$ execution. As the $A^2MPs$ are being executed, the end devices 160 continuously send $A^2MP$ task execution status feedback to the edge server 110. These feedback messages are packets of constant size, transmitted frequently (more information on traffic patterns below), and are directed to the central application controller circuitry 1122.

The central application controller circuitry 1122 utilizes this feedback information to maintain awareness of the task execution status in the end devices 160. Additionally, it assesses potential safety issues that may arise during the task execution. FIG. 5 illustrates an example of a task graph 170 associated with the execution of a simple pick-and-place task, along with the corresponding communication protocol described above.

B. Task Execution Status Traffic Profile

FIG. 7 illustrates an example of an $A^2MP$ task execution status traffic profile 700 in accordance with aspects of the disclosure. The transmission time from an end device 160 is based on the DMP parameter, cartesian, and joint space rules.

The execution of an $A^2MP$ in an end device 160 is associated with the transmission of $A^2MP$ task execution status feedback to the central application controller circuitry 1122 in the edge server 110. The network traffic related to this feedback depends on the $A^2MP$ state in the parameter, joint, and cartesian space. Consequently, although the status reports are of constant size (i.e., packets sent over the wireless communication channel 120 have the same size), their traffic profile is influenced by the configuration of $A^2MP$ task execution status feedback triggers based on the $A^2MP$ state in the parameter, joint, and cartesian space. As depicted in the figure, the triggering rules for the feedback change depending on the portion of the task being executed by the $A^2MP$. The $A^2MP$ task execution status messages are transmitted at a rate corresponding to a location along the trajectory in a canonical variable domain. This change in rules can be implemented to achieve a higher granularity of status feedback in the time domain when performing critical or essential parts of the $A^2MP$.

C. Wireless Aware Token Distribution

Figure 8:
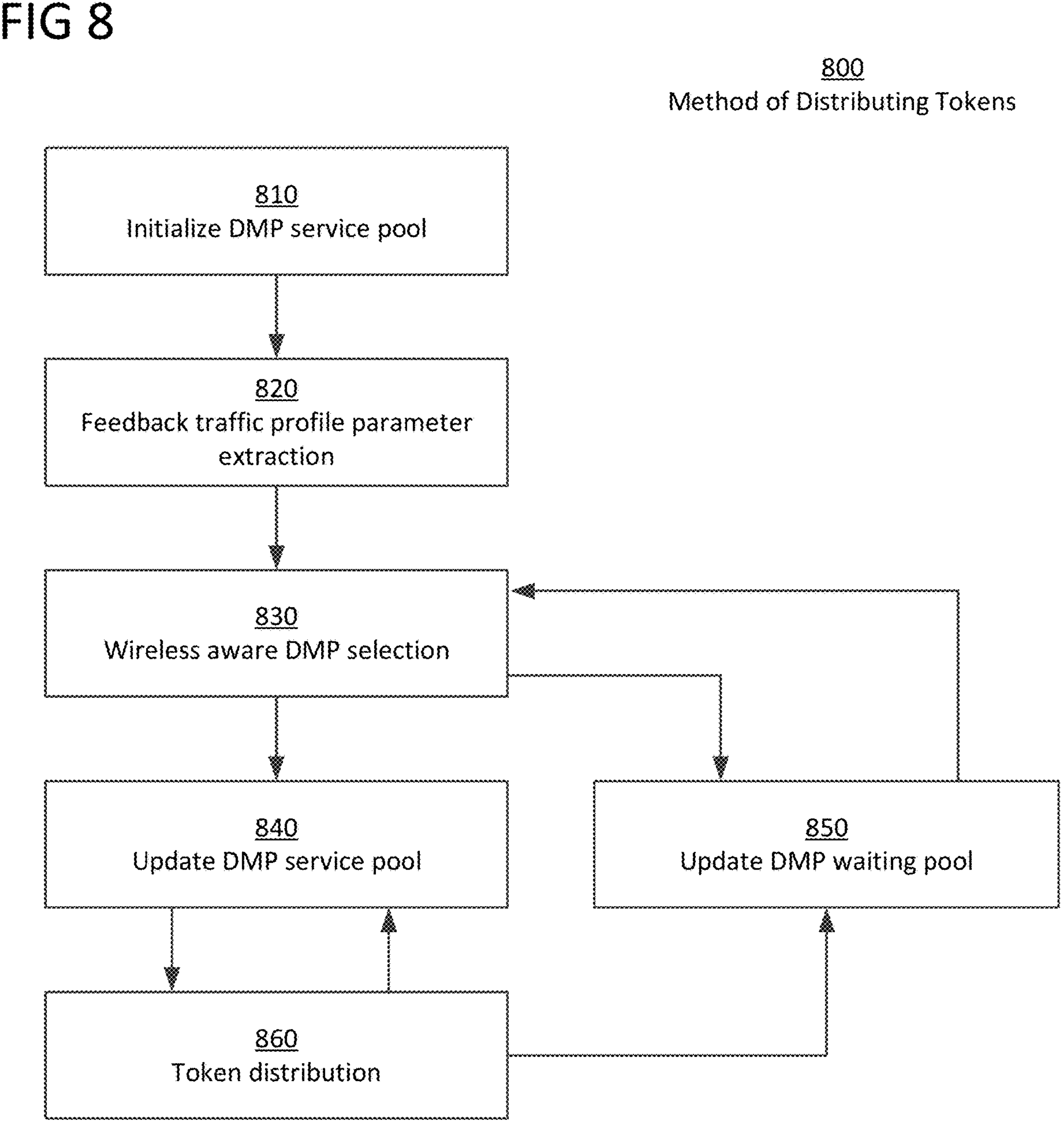
FIG. 8 illustrates a flow diagram of a method of distributing tokens in accordance with aspects of the disclosure.

FIG. 8 illustrates a flow diagram of method 800 of distributing tokens in accordance with aspects of the disclosure. These tokens enable the execution of the $A^2MP$ on the end device 160. The central application controller circuitry 1122 decides to distribute the tokens after negotiating with the wireless controller circuitry 1124.

In Step 810, the central application controller circuitry 1122 initializes a DMP service pool, which comprises an initial set of $A^2MPs$ and their corresponding $A^2MP$ parameters for the task to be executed. Specifically, the central application controller circuitry 1122 identifies a first set of N $A^2MPs$ corresponding to different tasks to be executed, $P_i$, 1, . . . , N.

In Step 820, for each $A^2MP$, the central application controller circuitry 1122 collects a set of parameters. These parameters include the maximum and minimum interpacket arrival time $$\mu_{i,j}^{max},$$

$$\mu_{i,j}^{min},$$

reliability $\eta_{i,j}$, worst case latency $\lambda_{i,j}$, feedback packet size $\rho_{i,j}$ and priority level $\eta_{i,j}$. Here, j represents the j-th $A^2MP$ in the task graph 170 defined for $P_i$. It is noted that these parameters are examples, and the disclosure is not limited to these particular parameters.

In Step 830, the processor circuitry 112 selects the $A^2MPs$ that may be served based on the $A^2MP$ parameters and the condition of the wireless communication channel 120 between the edge server 110 and the client device 140. The central application controller circuitry 1122 shares this information, which includes the first set of N $A^2MPs$ and their parameters, with the wireless controller circuitry 1124. Using this information, the wireless controller circuitry 1124 evaluates the wireless channel conditions and informs the central application controller circuitry 1122 about the $A^2MPs$ from the service pool that can be served.

In Step 850, the $A^2MPs$ not served by the wireless controller circuitry 1124 are removed from the service pool (840) and transferred to the $A^2MP$ waiting pool (850).

In Step 860, the wireless controller circuitry 1124 subsequently distributes the tokens to the client devices 140 for execution by the end devices 160. As new $A^2MPs$ enter the $A^2MP$ waiting pool (850) and others leave the $A^2MP$ service pool (840) due to ($A^2MP$ execution completion), the wireless controller circuitry 1124 continues to provide feedback to the central application controller circuitry 1122, enabling the issuance of new tokens.

The disclosed aspects provide several advantageous features.

Achieving latency invariance for coordinated low-level control is made possible through the formulation of task graphs for distributed execution by end clients and a coordination-aggregator edge server. This formulation utilizes flexible motion $\tau A^2MP$ tokens, which are asynchronous and single-IP-package end device state messages. These tokens enable the initiation, cessation, delay, and triggering of situation-dependent end device behaviors. By decoupling the edge server using tokens from the strict latency constraint between the client device, motor drivers, and encoders, this mechanism effectively manages networking uncertainty for sensor-actor device in relation to task variability.

End device control and coordination are designed to tolerate uncertainty. This is addressed through probabilistic modeling of joint execution and communication behaviors of the end devices and the network. The approach connects fine-grained trajectory updates with the state of the communication channel, taking into account task state and factory conditions. Trajectory updates are generated and transmitted using $\delta A^2MP$ progress deltas, which integrate implicit and deformable curves with respect to a sliding canonical system. This approach allows for uniform control of motions, independent of trial variations typically caused by sensor noise and process variability in relation to the position and orientation of target task frames.

In addition to the economic benefits offered by the edge-aggregation approach enabled by aspects of this disclosure, the $A^2MPs$ provide the capability to model safety regions at a variable rate triggered by sensors or events. This variability is ideal for dynamically sequencing checkpoints by the edge server. As a result, rapid composition and modification of end device-based manufacturing with continuous integration becomes possible. This capability ensures robust, detectable, and verifiable behaviors within the composed network and computation processes.

Scalable robot operations in edge frameworks prioritize collective tasks and network behaviors for low-level control. This includes large-scale coordinated execution aggregation, ensuring efficient and synchronized task execution.

Orchestrators effectively partition communication workflows without compromising responsiveness or flexibility. The disclosed aspects introduce a comprehensive robot-centric networking system that efficiently reduces and manages communication workflows.

The disclosed aspects also allow asynchronous updates and on-the-fly control changes with uncertainty-aware execution in flexible and reconfigurable robot production cells. This flexibility enables seamless updates and control changes, even in uncertain conditions.

The aspects offer a cost-effective distributed solution that seamlessly integrates autonomous mobile robots (AMRs) and human-robot interaction (HRI) within manufacturing robot cells, enhancing reconfigurability.

Furthermore, the wireless approach enables the coexistence of ad-hoc devices with robot networks. This wireless flexibility expands collaboration possibilities in industrial settings, including the use of HRI XR head-mounted devices and immersive interfaces for robot-to-robot and human-to-robot collaborations.

The terms "processor," "processor circuitry," "processor circuitry," "controller," or "controller circuitry," as used herein, may be understood as any technological entity that allows the handling of data. The data may be handled according to one or more specific functions executed by the processor, processor circuitry, or controller. Further, processor circuitry, a processor, or a controller as used herein may be understood as any circuit, e.g., any analog or digital circuit. Processor circuitry, a processor, or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, described below in further detail, may also be understood as processor circuitry, a processor, controller, or logic circuit. It is understood that any two (or more) of the processors, controllers, logic circuits, or processing circuitries detailed herein may be realized as a single entity with equivalent functionality or the like, and conversely that any single processor, controller, logic circuit, or processor circuitry detailed herein may be realized as two (or more) separate entities with equivalent functionality or the like.

As used herein, “storage medium” or “memory” is a computer-readable medium in which data or information can be stored for retrieval. References to “storage medium” or “memory” included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, and data buffers, among others, are also embraced herein by the term memory.

In one or more implementations described herein, processor circuitry or controller circuitry can include memory that stores data and/or instructions. The memory can be any well-known volatile and/or non-volatile memory, including read-only memory (ROM), random access memory (RAM), flash memory, magnetic storage media, an optical disc, erasable programmable read-only memory (EPROM), programmable read-only memory (PROM). The memory can be non-removable, removable, or a combination of both.

The techniques of this disclosure may also be described in the following examples.

Example 1. A component of an edge server, comprising: processor circuitry; and a non-transitory computer-readable storage medium including instructions that, when executed by the processor circuitry, cause the processor circuitry to: distribute, to a client device, tokens that enable its end device to execute respective asynchronous adaptive motion primitives ($A^2$MPs) of a task graph of a task, wherein an $A^2$MP is a motion primitive of encoded motion factoring in motion updates from the end device; receive $A^2$MP task execution status messages during execution of the $A^2$MPs; and dynamically update the token distribution or the task graph based on the $A^2$MP task execution status messages to modify a trajectory of the end device.

Example 2. The component of example 1, wherein the instructions that further cause the processor circuitry to: distribute, to a plurality of client devices, tokens that enable their end devices to execute $A^2$MPs of respective task graphs defining respective tasks; and temporally coordinate the execution of the $A^2$MPs by the end devices.

Example 3. The component of any one or more of examples 1-2, wherein the instructions that further cause the processor circuitry to: temporally coordinate the execution of the $A^2$MPs by inserting waypoints in each end device trajectory to be reached at a same time.

Example 4. The component of any one or more of examples 1-3, wherein the instructions that further cause the processor circuitry to: receive the $A^2$MP task execution status messages at a rate based on the temporal coordination of the execution of the $A^2$MPs.

Example 5. The component of any one or more of examples 1-4, wherein the instructions that further cause the processor circuitry to: dynamically update the distribution of the token or the task graph based on a monotonically changing canonical progress variable that changes independently of the modification of the trajectory of the end device.

Example 6. The component of any one or more of examples 1-5, wherein the instructions that further cause the processor circuitry to: receive the $A^2$MP task execution status messages at a rate based on a condition of a communication channel between the edge server and the client device.

Example 7. The component of any one or more of examples 1-6, wherein the condition of the communication channel is based on communication channel throughput, capacity, or latency.

Example 8. The component of any one or more of examples 1-7, wherein the communication channel between the edge server and the client device is a wireless communication channel, and a communication channel between the client device and the end device is a wired communication channel having a lower latency than the wireless communication channel.

Example 9. The component of any one or more of examples 1-8, wherein the instructions that further cause the processor circuitry to: receive the $A^2$MP task execution status messages at a rate corresponding with a location along the trajectory in a canonical variable domain.

Example 10. The component of any one or more of examples 1-9, wherein the instructions that further cause the processor circuitry to: receive the $A^2$MP task execution status messages at a rate based on task variability with respect to the trajectory in task space.

Example 11. The component of any one or more of examples 1-10, wherein the $A^2$MP task execution status messages include $A^2$MP deltas in parameter, joint, or cartesian space.

Example 12. The component of any one or more of examples 1-11, wherein the instructions that further cause the processor circuitry to: define the task graph; and distribute the task graph to the client device when the task is assigned or changed.

Example 13. The component of any one or more of examples 1-12, wherein the instructions that further cause the processor circuitry to distribute the tokens by: identifying an initial set of $A^2$MPs corresponding to the task to be executed and their corresponding $A^2$MP parameters; and based on the $A^2$MP parameters and a condition of a communication channel between the edge server and the client device, select which of the $A^2$MPs of the initial set are distributable.

Example 14. A component of a client device, comprising: processor circuitry; and a non-transitory computer-readable storage medium including instructions that, when executed by the processor circuitry, cause the processor circuitry to: receive, from an edge server, tokens that enable an end device of the client device to execute respective asynchronous adaptive motion primitives ($A^2$MPs) of a task graph of a task, wherein an $A^2$MP is a motion primitive of encoded motion factoring in motion updates from the end device; send, to the edge server, $A^2$MP task execution status messages during execution of the $A^2$MPs; and modify a trajectory of the end device based on the task graph or received tokens that are dynamically updated by the edge server based on the $A^2$MP task execution status messages.

Example 15. The component of example 14, wherein the instructions that further cause the processor circuitry to: send, to the edge server, the $A^2$MP task execution status messages at a rate based on a condition of a communication channel between the edge server and the client device.

Example 16. The component of any one or more of examples 14-15, wherein the condition of the communication channel is based on communication channel throughput, capacity, or latency.

Example 17. The component of any one or more of examples 14-16, wherein the communication channel between the edge server and the client device is a wireless communication channel, and a communication channel between the client device and the end device is a wired communication channel having a lower latency than the wireless communication channel.

Example 18. The component of any one or more of examples 14-17, wherein the instructions that further cause the processor circuitry to: send the $A^2MP$ task execution status messages at a rate corresponding with a location along the trajectory in a canonical variable domain.

Example 19. The component of any one or more of examples 14-18, wherein the instructions that further cause the processor circuitry to: receive the $A^2MP$ task execution status messages at a rate based on task variability with respect to the trajectory in task space.

Example 20. The component of any one or more of examples 14-19, wherein the instructions that further cause the processor circuitry to: receive dynamically updated tokens or task graphs based on a monotonically changing canonical progress variable that changes independently of the modification of the trajectory of the end device.

While the foregoing has been described in conjunction with the exemplary aspect, it is understood that "exemplary" is merely meant as an example rather than the best or optimal. Accordingly, the disclosure is intended to cover alternatives, modifications, and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An edge server device, comprising:

processor circuitry; and a non-transitory computer-readable storage medium including instructions that, when executed by the processor circuitry, cause the processor circuitry to:

distribute, to a client device, tokens that enable its end device to execute respective asynchronous adaptive motion primitives (A2MPs) of a task graph of a task, wherein an A2MP is a motion primitive of encoded motion factoring in motion updates from the end device;

receive A2MP task execution status messages including A2MP deltas in parameter, joint, or cartesian space during execution of the A2MPs; and dynamically update the task graph based on the A2MP task execution status messages to modify a trajectory of the end device.

2. The edge server device of claim 1, wherein the instructions that further cause the processor circuitry to:

distribute, to a plurality of client devices, tokens that enable their end devices to execute A2MPs of respective task graphs defining respective tasks; and temporally coordinate the execution of the A2MPs by the end devices.

3. The edge server device of claim 2, wherein the instructions that further cause the processor circuitry to:

temporally coordinate the execution of the A2MPs by inserting waypoints in each end device trajectory to be reached at a same time.

4. The edge server device of claim 2, wherein the instructions that further cause the processor circuitry to:

receive the A2MP task execution status messages at a rate based on the temporal coordination of the execution of the A2MPs.

5. The edge server device of claim 1, wherein the instructions that further cause the processor circuitry to:

dynamically update the distribution of the token or the task graph based on a monotonically changing canonical progress variable that changes independently of the modification of the trajectory of the end device.

6. The edge server device of claim 1, wherein the instructions that further cause the processor circuitry to:

receive the A2MP task execution status messages at a rate based on a condition of a communication channel between the edge server and the client device.

7. The edge server device of claim 6, wherein the condition of the communication channel is based on communication channel throughput, capacity, or latency.

8. The edge server device of claim 6, wherein the communication channel between the edge server and the client device is a wireless communication channel, and a communication channel between the client device and the end device is a wired communication channel having a lower latency than the wireless communication channel.

9. The edge server device of claim 1, wherein the instructions that further cause the processor circuitry to:

receive the A2MP task execution status messages at a rate corresponding with a location along the trajectory in a canonical variable domain.

10. The edge server device of claim 1, wherein the instructions that further cause the processor circuitry to:

receive the A2MP task execution status messages at a rate based on task variability with respect to the trajectory in task space.

11. The edge server device of claim 1, wherein the A2MP task execution status messages include A2MP deltas in parameter, joint, or cartesian space.

12. The edge server device of claim 1, wherein the instructions that further cause the processor circuitry to:

define the task graph; and distribute the task graph to the client device when the task is assigned or changed.

13. The edge server device of claim 1, wherein the instructions that further cause the processor circuitry to distribute the tokens by:

identifying an initial set of A2MPs corresponding to the task to be executed and their corresponding A2MP parameters; and based on the A2MP parameters and a condition of a communication channel between the edge server and the client device, select which of the A2MPs of the initial set are distributable.

14. A component-of-a-client device, comprising:

processor circuitry; and a non-transitory computer-readable storage medium including instructions that, when executed by the processor circuitry, cause the processor circuitry to:

receive, from an edge server, tokens that enable an end device of the client device to execute respective asynchronous adaptive motion primitives (A2MPs) of a task graph of a task, wherein an A2MP is a motion primitive of encoded motion factoring in motion updates from the end device;

send, to the edge server, A2MP task execution status messages including A2MP deltas in parameter, joint, or cartesian space during execution of the A2MPs; and modify a trajectory of the end device based on the task graph that is dynamically updated by the edge server based on the A2MP task execution status messages.

15. The client device of claim 14, wherein the instructions that further cause the processor circuitry to:

send, to the edge server, the A2MP task execution status messages at a rate based on a condition of a communication channel between the edge server and the client device.

16. The client device of claim 15, wherein the condition of the communication channel is based on communication channel throughput, capacity, or latency.

17. The client device of claim 15, wherein the communication channel between the edge server and the client device is a wireless communication channel, and a communication channel between the client device and the end device is a wired communication channel having a lower latency than the wireless communication channel.

18. The client device of claim 14, wherein the instructions that further cause the processor circuitry to:

send the A2MP task execution status messages at a rate corresponding with a location along the trajectory in a canonical variable domain.

19. The client device of claim 14, wherein the instructions that further cause the processor circuitry to:

receive the A2MP task execution status messages at a rate based on task variability with respect to the trajectory in task space.

20. The client device of claim 14, wherein the instructions that further cause the processor circuitry to:

receive dynamically updated tokens or task graphs based on a monotonically changing canonical progress variable that changes independently of the modification of the trajectory of the end device.

* * * * *